(12) United States Patent
Lau

(10) Patent No.: US 12,709,136 B2
(45) Date of Patent: Aug. 18, 2026

(54) AIR FRAGRANCE DIFFUSER SYSTEM FOR AUTOMOBILE

(71) Applicant: Michael Stephen Lau, Cypress, TX (US)

(72) Inventor: Michael Stephen Lau, Cypress, TX (US)

( * ) Notice: Subject to any disclaimer, the term of this patent is extended or adjusted under 35 U.S.C. 154(b) by 225 days.

(21) Appl. No.: 18/441,713

(22) Filed: Feb. 14, 2024

(65) Prior Publication Data

US 2025/0256551 A1 Aug. 14, 2025

(51) Int. Cl.

| | |
|---|---|
| ***B01F 3/04*** | (2006.01) |
| ***B60H 1/00*** | (2006.01) |
| ***B60H 3/00*** | (2006.01) |

(52) U.S. Cl.

CPC ....... *B60H 3/0035* (2013.01); *B60H 1/00735* (2013.01)

(58) Field of Classification Search

CPC ............ B05B 17/0646; B05B 17/0638; B05B 17/0615; B05B 17/0653; B60H 3/0007; B60H 3/0035; B60H 3/00

See application file for complete search history.

(56) References Cited

U.S. PATENT DOCUMENTS

2012/0291776 A1* 11/2012 Van Der Mark ..... A61M 15/00 128/200.14
2016/0361972 A1* 12/2016 Blackley ............ B60H 1/00785

FOREIGN PATENT DOCUMENTS

| | | | |
|---|---|---|---|
| CN | 115402061 | A | 11/2022 |
| JP | 4396672 | B2 | 1/2010 |
| KR | 20180033693 | A | 7/2018 |

* cited by examiner

*Primary Examiner* — Tuongminh N Pham
(74) *Attorney, Agent, or Firm* — EVERGREEN VALLEY LAW GROUP; Kanika Radhakrishnan

(57) ABSTRACT

The present disclosure provides an air fragrance diffuser system. The air fragrance diffuser system includes a mesh atomizer device for storing a fragrance oil. The air fragrance diffuser system also includes an electrical power source for providing electrical power to the mesh atomizer device to convert the fragrance oil into a mist of droplets. The air fragrance diffuser system further includes a transmission system coupled to the mesh atomizer device for receiving the mist of droplets and transmitting the mist of droplets into a passenger compartment of the automobile.

16 Claims, 8 Drawing Sheets

214
400
212
210
220
232
404
402
204
202

214
500
230
212
210
232
220
202
204
502

AIR FRAGRANCE DIFFUSER SYSTEM FOR AUTOMOBILE

TECHNICAL FIELD

The present disclosure generally relates to an air fragrance diffuser system and, more particularly, to the air fragrance diffuser system integrated within an automobile for providing air freshening fragrance within a passenger compartment of the automobile.

BACKGROUND

Generally, an unpleasant odor develops inside the passenger compartment of an automobile despite maintenance of the passenger compartment. For instance, eating or smoking in the passenger compartment of the automobile may cause an unpleasant odor. Such an odor can go out of the windows of the automobile. However, venting out the unpleasant odor through the windows may not be feasible most of the time due to harsh weather conditions or many other reasons. In some cases, an unpleasant odor may also arise from an air-conditioning ventilation system due to the accumulation of moisture therein, which enables the growth of microorganisms. The microorganisms thrive on the humidity in the ventilating system and may cause an unpleasant odor inside the passenger compartment. An owner/driver of the automobile may find it difficult to clean the air-conditioning ventilation system regularly as disassembling the air-conditioning system and assembling it every time may be tedious.

Various devices such as air fragrance dispensers for reducing the odor and providing an alluring aroma have been traditionally used in automobiles. However, all existing solutions are short-lived and often require constant attention from the person desiring a good aroma in the passenger compartment of the automobile. Moreover, there is a need to replace chemical fragrance solutions with suitable natural fragrance solutions, which are beyond the reach of occupants of the automobile and are not harmful to the health of human beings, but instead offer healing properties such as boosting resilience against cold and flu, reducing inflammation in the lungs, relieving congestion and soothing respiratory illnesses, etc. One potential solution involves an air fragrance diffuser system integrated with the automobile and operates based on a jet nebulization process. Typically, such a system comprises an air pressure-generating source and an atomizer device operating on the principle of a siphoning process, incorporating components like a jet orifice and a siphon tube. However, this air fragrance diffuser system, operating based on the jet nebulization process, comes with various limitations. For instance, despite being electrically controlled, the system has a mechanical nature of operation. The use of compressed air and mechanical components makes it noisy. Additionally, it tends to be bulkier and requires more space, mainly, due to the air pressure-generating source and various mechanical components. Moreover, it requires more maintenance as it is composed of a large number of mechanical components. The system's operational control is complex and challenging, requiring the coordinated work of a substantial number of mechanical components. Finally, due to the complexity of operational control and the abundance of mechanical components, such a system may result in the wastage of the fragrance composition intended for use by the air fragrance diffuser system.

Therefore, in light of the foregoing discussion, there exists a need to overcome the aforementioned drawbacks associated with the air fragrance diffuser system.

SUMMARY

Various embodiments of the present disclosure provide an air fragrance diffuser system integrated within an automobile for providing air freshening fragrance within a passenger compartment of the automobile. The air fragrance diffuser system operates based on the mesh atomization principle, making it less noisy, more compact, and space efficient. Further, the system includes fewer operational components, requires less maintenance, and features a simple and controlled operation, potentially reducing wastage of the fragrance composition compared to conventional air fragrance diffuser systems. The said aspects will be explained in greater detail herein later.

An embodiment of the present disclosure provides an air fragrance diffuser system for use in an automobile. The air fragrance diffuser system includes a mesh atomizer device for storing fragrance oil. The air fragrance diffuser system also includes an electrical power source for providing electrical power to the mesh atomizer device to convert the fragrance oil into a mist of droplets. The air fragrance diffuser system further includes a transmission system coupled to the mesh atomizer device for receiving the mist of droplets and transmitting the mist of droplets into the passenger compartment of the automobile.

An embodiment of the present disclosure provides an air fragrance diffuser system for use in an automobile. The air fragrance diffuser system includes a plurality of mesh atomizer devices. The air fragrance diffuser system also includes an electrical power source for providing electrical power to the plurality of mesh atomizer devices to convert the fragrance oil into the mist of droplets. The air fragrance diffuser system further includes a transmission system coupled to the plurality of mesh atomizer devices for receiving the mist of droplets and transmitting the mist of droplets into a passenger compartment of the automobile. The air fragrance diffuser system also includes an electronic control unit operatively coupled to the plurality of mesh atomizer devices. The electronic control unit is configured to control the operation of the electrical power source and the transmission system.

BRIEF DESCRIPTION OF THE DRAWINGS

The disclosure itself, together with further features and advantages, will become apparent from consideration of the following brief description, taken in conjunction with the accompanying drawings. One or more embodiments of the present disclosure are now described, by way of example only wherein like reference numerals represent like elements and in which.

Figure 1:
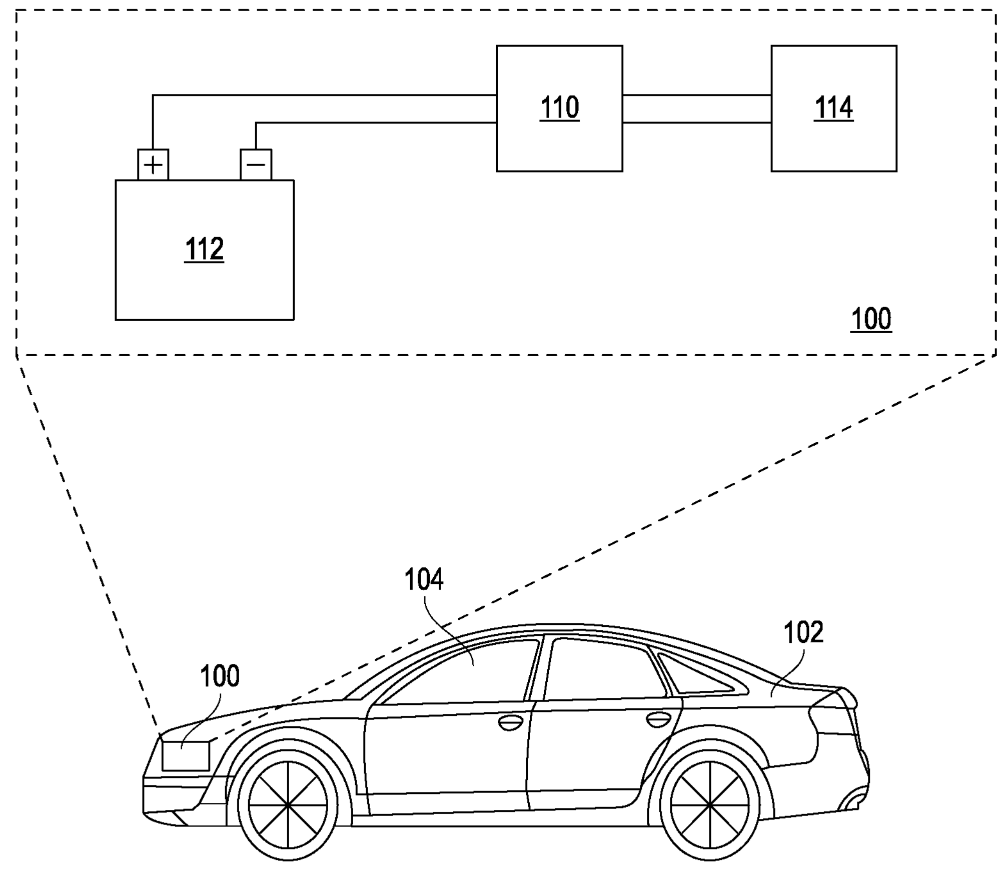
FIG. 1 illustrates a simplified schematic representation of an air fragrance diffuser system for an automobile, in accordance with an example embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in schematic line diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various example embodiments of the present disclosure provide an air fragrance diffuser system for providing fragrance mist to a passenger compartment of an automobile via transmission channels such as existing ventilation systems or using separate vents.

The air fragrance diffuser system, described herein, can be positioned within the hood of the automobile so that the whole diffuser system is concealed from the occupants of the automobile. Alternatively, the air fragrance diffuser system may be positioned in a trunk or a cabin of the automobile. The diffuser system includes a mesh atomizer device that receives electrical power from an electrical power source. The mesh atomizer device operates based on the principle of mesh atomization to convert a fragrance oil into a mist of droplets. The mist of droplets is channeled through suitable ventilation systems (also referred to as 'vents') into the passenger compartment of the automobile. Examples of the ventilation systems can be existing vents of Heating, Ventilation, and Air Conditioning (HVAC) system of the automobile or vents dedicated to the diffuser system. The diffuser system is communicably coupled to a user device such as a wireless transceiver to control the operation and refill of the diffuser systems depending upon the preferences of the user. The air fragrance diffuser system may include a plurality of mesh atomizer devices, each having a sealed enclosed chamber for containing same or different fragrance oil. Therefore, the air fragrance diffuser system of the present disclosure can be objectively implemented for introducing pleasant fragrances from a single or multiple sealed enclosed chambers, incorporating anti-bacterial and/or anti-viral benefits, and addressing the removal of unpleasant odors or the molecular neutralization of all odors.

Various embodiments of the air fragrance diffuser system for use in the automobile are described herein with reference to FIGS. 1 through 11.

FIG. 1 illustrates a simplified schematic representation of an air fragrance diffuser system 100 for an automobile 102, according to an embodiment of the present disclosure. The air fragrance diffuser system 100 may be coupled with vents of a climate-controlled system of the automobile 102 to enable the fragrance (in the form mist of droplets or aerosol) to mix with the air before being blown into a cabin (e.g., a passenger compartment 104) of the automobile 102. An example of a climate-controlled system is the HVAC system of the automobile 102. Alternatively, or additionally, the air fragrance diffuser system 100 may have its own transmission system that can directly blow the mist of droplets into the passenger compartment 104. As shown in FIG. 1, the air fragrance diffuser system 100 includes a mesh atomizer device 110, an electrical power source 112, and a transmission system 114.

Figure 2:
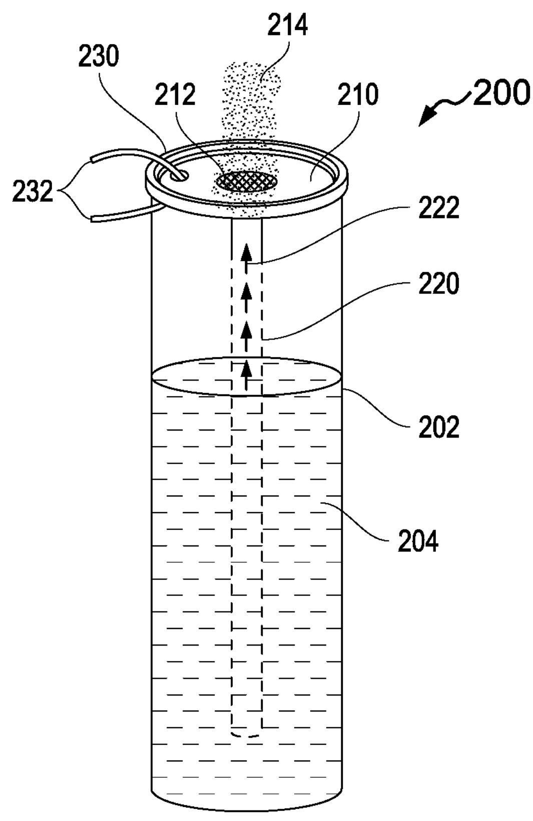
FIG. 2 illustrates a simplified schematic representation of a mesh atomizer device, according to an embodiment of the present disclosure.

Referring now to FIG. 2, illustrates a simplified schematic representation of a mesh atomizer device 200, such as the mesh atomizer device 110, according to an embodiment of the present disclosure. The mesh atomizer device 200 includes a sealed enclosed chamber 202 containing a fragrance oil 204. The sealed enclosed chamber 202 defines a confined space designed to securely contain the fragrance oil 204 therein, such that the fragrance oil 204 is isolated from the external environment. The sealed enclosed chamber 202 may be configured to have the shape of a hollow tubular or any elongated polygonal structure. Further, the sealed enclosed chamber 202 may be made of any suitable material, such as plastic, metal, or any combination thereof. Typically, the sealed enclosed chamber 202 is configured to have a size (for example a few hundred milliliters to liters), which allows suitable installation in a space-efficient manner at any location in proximity to the HVAC system of the automobile 102.

As mentioned herein above, the sealed enclosed chamber 202 contains the fragrance oil 204. According to an embodiment, the fragrance oil 204 is a concentrated liquid composed of aromatic compounds designed to emit a specific scent or fragrance. Additionally, the fragrance oil 204 may include medicinal or healing properties such as boosting resilience against cold and flu, reducing inflammation in the lungs, relieving congestion, soothing respiratory illnesses, etc. For instance, the fragrance oil 204 may encompass anti-bacterial and/or anti-viral properties (or natural antimicrobial characteristics), thereby adding an extra dimension of therapeutic potential to the fragrance oil 204 within the air fragrance diffuser system 100. The fragrance oil 204 may be extracted from natural sources (such as flowers, fruits, or spices) or chemically synthesized. In an example, the fragrance oil may include but is not limited to *eucalyptus* oil, lavender oil, rosemary oil, and the like.

The mesh atomizer device 200 also includes a mesh 210 having a plurality of holes 212. The mesh 210 is arranged on the sealed enclosed chamber 202 to be in contact with the fragrance oil 204. According to an embodiment, the mesh 210 may be made of a suitable material such as stainless steel, ceramics, or other alloys that are durable and corrosion-resistant. Further, the mesh 210 may be made of a material that provides enough flexibility to vibrate when a certain amount of force is applied thereon. The mesh 210 includes the plurality of holes 212, for example, the number of holes could range from a few hundred to thousands, based on a desired quantity of mist of droplets 214 to be atomized per unit time by the mesh atomizer device 200. Further, the plurality of holes 212 in the mesh are typically microscopic in size, having diameters in micrometers (μm). Typically, the size of the plurality of holes 212 is precisely engineered to facilitate the controlled atomization of the fragrance oil 204. Specifically, the plurality of holes 212 is small enough to break down the fragrance oil 204 into the mist of droplets 214.

As shown, the mesh 210 is arranged on the sealed enclosed chamber 202 to close an opening of the sealed enclosed chamber 202 like a cap. Further, the mesh 210 is configured to be in contact with the fragrance oil 204, for example with the help of a wick 220. The wick 220 assists in establishing contact between the mesh 210 and the fragrance oil 204, based on a principle of capillary action. The wick 220 facilitates the transferring of an adequate amount of the fragrance oil 204 required for the process of atomization. A movement of the fragrance oil 204 towards the mesh 210 via the wick 220 due to capillary action is depicted with the help of arrows 222. In another embodiment, the mesh 210 is allowed to be in contact with the fragrance oil 204 via one of: a capillary tube, a micropump (not shown), or gravity. In this configuration, the capillary tube (not shown) facilitates contact by leveraging capillary action, where the fragrance oil 204 is drawn into the mesh 210 due to cohesive and adhesive forces. Alternatively, the micropump (not shown) may actively transport the fragrance oil 204 to the mesh 210, ensuring controlled and consistent contact. Additionally, gravity, as a natural force, allows the fragrance oil 204 to flow down and come into contact with the mesh 210, when the mesh atomizer device 200 is positioned in an upside-down orientation. Alternatively, the mesh 210 may be configured to be in contact with the fragrance oil 204, for example with the help of a soaked material, such as a sponge. The sponge may be soaked with the fragrance oil 204 such that the soaked sponge serves as a continuous and consistent source of the fragrance oil 204, ensuring a steady supply to the mesh 210.

The mesh atomizer device 200 further includes a vibratory element 230, operatively coupled with the mesh 210 and the electrical power source 112 (shown in FIG. 1). The operation of the vibratory element 230 causes formation of the mist of droplets 214 via the mesh 210, which will be explained in greater detail herein later in conjunction with FIG. 3. According to an embodiment, as shown in FIG. 2, the vibratory element 230 is a piezoelectric ring coupled to the mesh 210. The piezoelectric ring is typically made of a piezoelectric material, such as lead zirconate titanate (PZT), which exhibits a piezoelectric effect. This effect means that when subjected to an electrical voltage, the piezoelectric material deforms or vibrates, generating mechanical oscillations. In the context of a mesh atomizer device 200, the piezoelectric ring is precisely designed in terms of size and shape to induce vibrations in the mesh 210. As the piezoelectric ring vibrates, it imparts mechanical energy to the mesh 210, causing it to oscillate. This mechanical motion aids in breaking down the fragrance oil 204 into the mist of droplets 214, contributing to the atomization process. The main function of the piezoelectric ring, therefore, is to generate controlled vibrations that allow the atomization process.

As shown, the vibratory element 230, i.e., the piezoelectric ring, is coupled to electrical wires 232 for being operatively coupled to the electrical power source 112 (shown in FIG. 1). According to an embodiment, the electrical power source 112 is one of: a battery of the automobile 102 or an additional battery integrated with the mesh atomizer device 200. For example, the battery of the automobile 102 can be a lead-acid battery or a lithium-ion battery. It will be evident to a person skilled in the art that based on an operational configuration the mesh atomizer device 200 may be designed to have a power consumption in a range of 5-10 watts or 20-100 watts. Further, the advantage of using the automobile's battery as the electrical power source 112 provides the convenience, stability, and reliability on an existing power source within the automobile 102. However, an integrated additional battery offers portability and customization, allowing the mesh atomizer device 200 to operate independently of the automobile 102.

Figure 3:
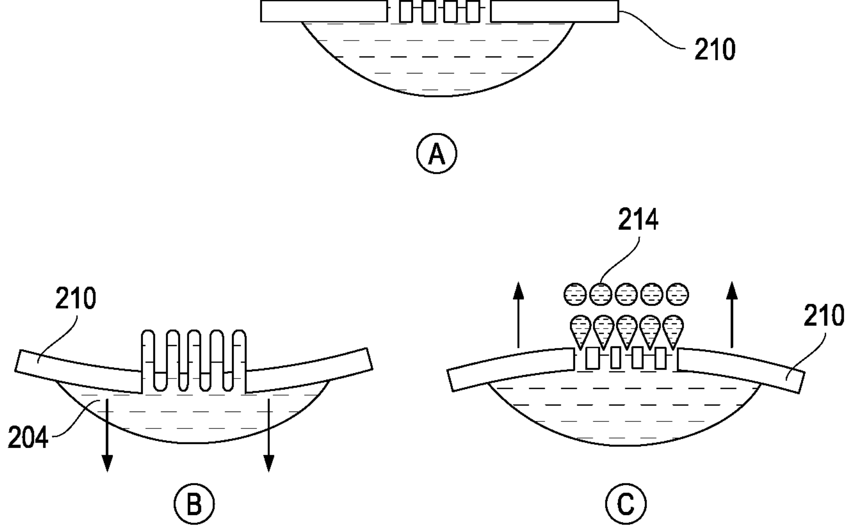
FIG. 3 illustrates a simplified schematic representation of a mesh atomization principle, according to an embodiment of the present disclosure.

Referring now to FIG. 3, a simplified schematic representation of a mesh atomization principle is illustrated, according to an embodiment of the present disclosure. As shown, the mesh 210 is configured to attain a linear position A, a downward-curved position B and an upward-curved position C. The mesh 210 is configured to remain in the linear position A, when the vibratory element 230 (shown in FIG. 2), i.e., the piezoelectric ring, is not supplied with the electrical power from the electrical power source 112 (shown in FIG. 1). In simple words when the mesh atomizer device 200 is in a turned OFF state, the mesh 210 is in the linear position A. The mesh 210 attains the downward-curved position B and upward-curved position C when the vibratory element 230 is supplied with the electrical power or when the mesh atomizer device 200 is turned ON. Specifically, the piezoelectric ring vibrates, and it imparts mechanical energy to the mesh 210, causing it to oscillate, i.e., causing the mesh 210 to switch its position from the downward-curved position B to an upward-curved position C (and vice-versa). This mechanical motion (upward and downward) aids in breaking down the fragrance oil 204 into the mist of droplets 214 and pushing the mist of droplets 214 via the mesh 210, thereby causing the mesh atomization.

According to an embodiment, regulating the electrical power from the electrical power source 112 to the mesh atomizer device 200 allows controlling a frequency of vibration of the vibratory element 230 thereby regulating the size of droplets ejected by the mesh 210 to form the mist of droplets 214 from the fragrance oil 204. In an example, the frequency of vibration may be considered as a "resonance frequency", i.e., a natural frequency where a medium or object (the vibratory element 230 and the mesh 210) vibrates at the highest amplitude. An exemplary value for the resonance frequency could be around 1 MHz. By regulating the power supplied to the vibratory element 230, the mesh atomizer device 200 can control the resonance frequency. For example, higher resonance frequencies, achieved with higher power, tend to result in smaller droplets during atomization, while lower resonance frequencies may produce larger droplets. For instance, a resonance frequency of 1 MHz might yield a fine mist of droplets 214 in the micron range (e.g., 1 to 10 micrometers). The ability to adjust the resonance frequency by regulating power allows for customization of droplet size, optimizing the atomization process for specific applications. The mesh atomization principle, explained in conjunction with FIG. 3, is an active mesh atomization process or principle. A mesh atomizer device of the present disclosure can also operate based on a passive mesh atomization principle, which will be explained in conjunction with FIG. 4.

Figures 4, 5:
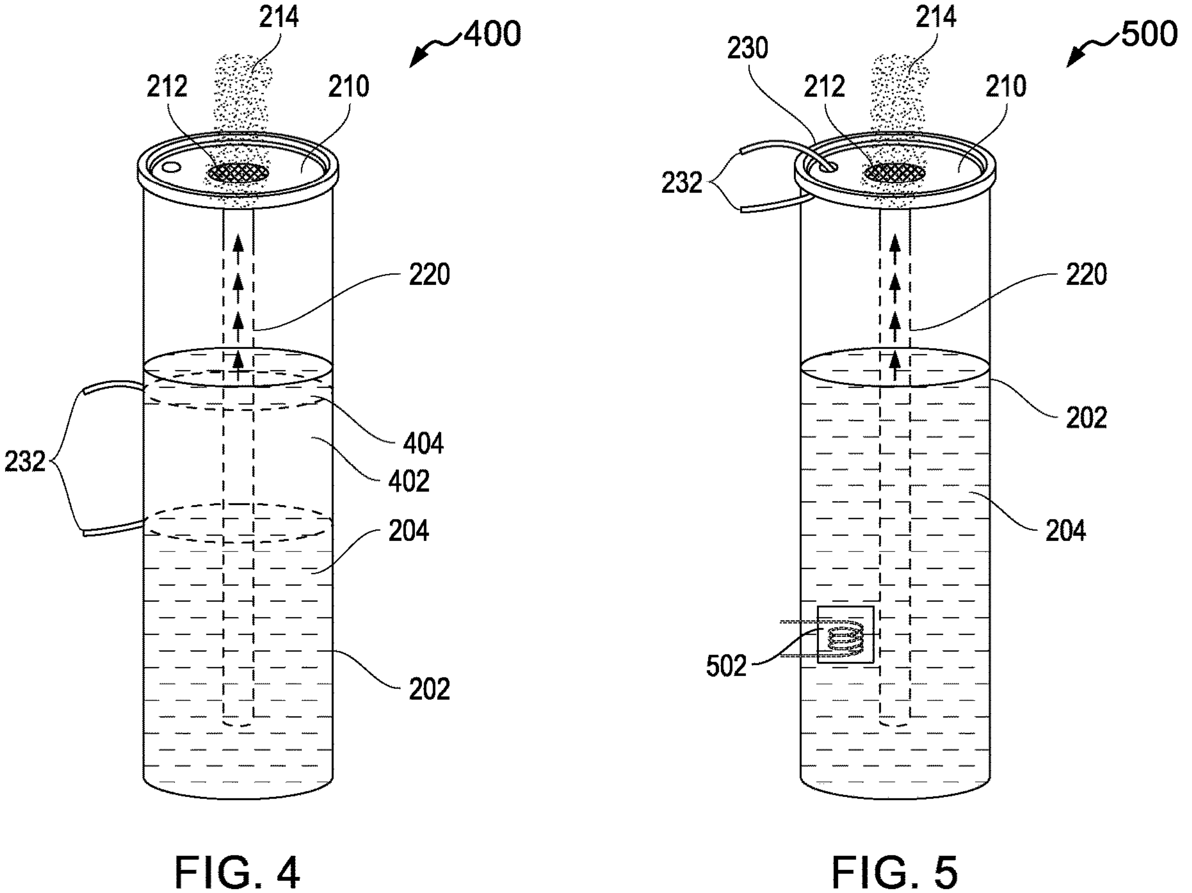
FIG. 4 illustrates a simplified schematic representation of a mesh atomizer device, according to another embodiment of the present disclosure.
FIG. 5 illustrates a simplified schematic representation of a mesh atomizer device, according to yet another embodiment of the present disclosure.

Referring now to FIG. 4, illustrates a simplified schematic representation of a mesh atomizer device 400, according to another embodiment of the present disclosure. As shown, the mesh atomizer device 400 is substantially similar to the mesh atomizer device 200 (depicted and explained in conjunction with FIG. 2). For example, the mesh atomizer device 400 also includes the sealed enclosed chamber 202 for containing the fragrance oil 204 and the mesh 210 having the plurality of holes 212. The mesh 210 is configured to be in contact with the fragrance oil 204 with the help of the wick 220. The mesh atomizer device 400 further includes a vibratory element 402 operatively coupled with the mesh 210 and the electrical power source 112 (shown in FIG. 1), however, the vibratory element 402 is an ultrasonic horn (unlike, the piezoelectric ring coupled with the mesh atomizer device 200) positioned adjacent to the mesh 210. The ultrasonic horn conducts vibration to the mesh 210 via a thin layer 404 of the fragrance oil 204 to form the mist of droplets 214. The ultrasonic horn may be electrically coupled to the electrical power source 112 using the electrical wires 232 for receiving the electrical power for the operation thereof. The mesh atomizer device 400 operates based on the passive mesh atomization principle.

According to an embodiment, the ultrasonic horn is a device designed to generate ultrasonic vibrations, typically at frequencies beyond the range of human hearing (above 20,000 hertz). As shown, the ultrasonic horn is strategically positioned adjacent to the mesh 210 and functions by conducting high-frequency vibrations through the thin layer 404 of the fragrance oil 204, which is in direct contact with the mesh 210. The ultrasonic horn acts as a mediator, transferring mechanical energy to the mesh 210 through the thin layer 404, inducing oscillations in the mesh 210. This process effectively generates the mist of droplets 214 from the fragrance oil 204. The term "passive mesh atomization" is used herein because the ultrasonic horn itself doesn't actively oscillate the mesh 210. Instead, it utilizes the thin layer 404 of the fragrance oil 204 to transmit vibrations to the mesh 210, allowing for the controlled and efficient atomization of the fragrance oil 204 into a fine mist of droplets 214.

Referring now to FIG. 5, illustrates a simplified schematic representation of a mesh atomizer device 500, according to yet another embodiment of the present disclosure. As shown, the mesh atomizer device 500 is substantially similar to the mesh atomizer device 200 (depicted and explained in conjunction with FIG. 2). For example, the mesh atomizer device 500 includes the sealed enclosed chamber 202 for containing the fragrance oil 204 and the mesh 210 having the plurality of holes 212. The mesh 210 is configured to be in contact with the fragrance oil 204 with the help of the wick 220. The mesh atomizer device 500 also includes the vibratory element 230 (such as the piezoelectric ring) operatively coupled with the mesh 210 and the electrical power source 112 (shown in FIG. 1). The operation of the vibratory element 230 causes the formation of the mist of droplets 214 via the mesh 210. According to an embodiment, the mesh atomizer device 500 also includes a microheater 502 for heating the fragrance oil 204 to regulate the viscosity of the fragrance oil 204. The microheater 502 may be a small heating element integrated into the sealed enclosed chamber 202 to regulate the temperature of the fragrance oil 204 during atomization. The microheater 502 may also obtain electrical power from the electrical power source 112 for the operation thereof. The microheater 502 works by applying controlled heat to the fragrance oil 204, thereby reducing its viscosity. By heating the fragrance oil 204, the microheater 502 lowers its viscosity, making it more fluid and easier to atomize. This is particularly advantageous in the case of high-viscosity liquids (when used as the fragrance oil 204) that may be challenging to atomize efficiently without additional assistance. Further, the controlled heating helps prevent clogging issues that mesh atomizer device 500 might encounter when dealing with thicker liquids or high-viscosity liquids. It will be evident that the mesh atomizer device 400 (having passive mesh atomization operation) may also include a similar microheater 502.

Figure 6:
FIG. 6 illustrates a simplified schematic representation of an air fragrance diffuser system, according to another embodiment of the present disclosure.
Figure 6:
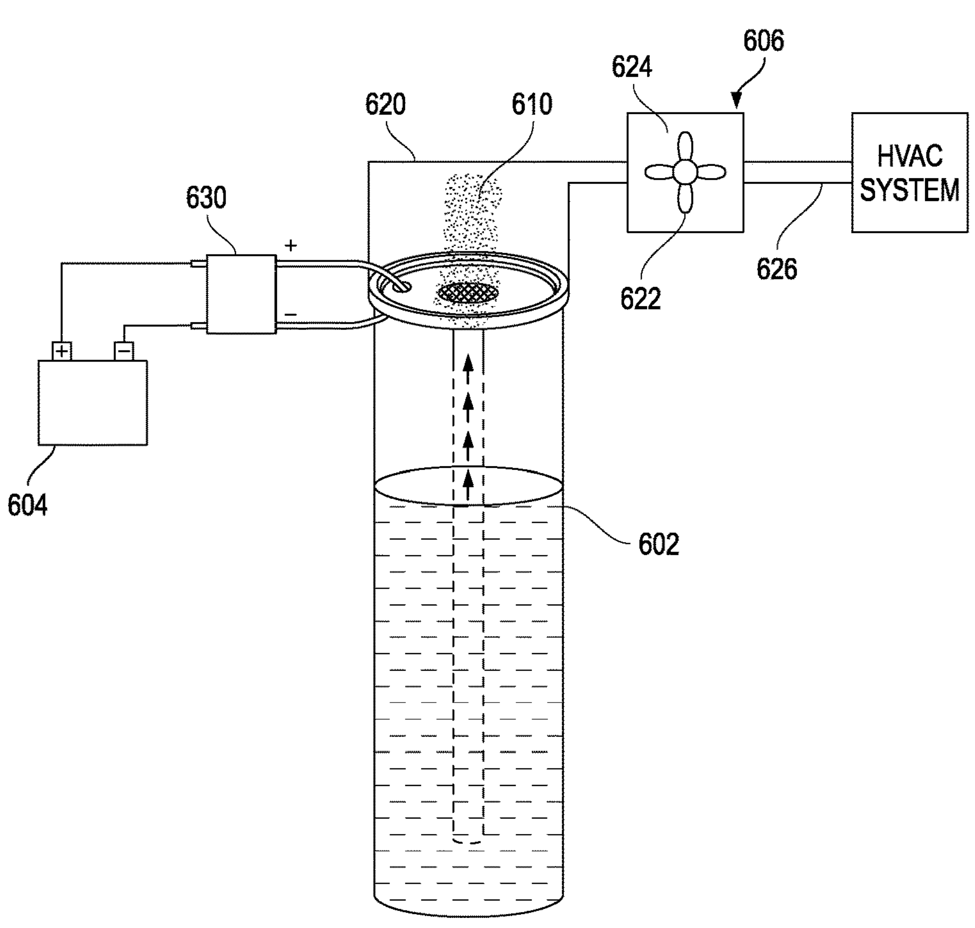

Referring now to FIG. 6, illustrated is a simplified schematic representation of an air fragrance diffuser system 600, according to another embodiment of the present disclosure. The air fragrance diffuser system 600 is similar to the air fragrance diffuser system 100, shown and explained in conjunction with FIG. 1. For example, the air fragrance diffuser system 600 includes a mesh atomizer device 602, such as the mesh atomizer device 110, which can be any one of the mesh atomizer devices 200, 400, 500 explained herein above in conjunction with FIGS. 2, 4 and 5, respectively. The air fragrance diffuser system 600 also includes an electrical power source 604, such as the electrical power source 112, explained herein above in conjunction with FIG. 1. The air fragrance diffuser system 600 further includes a transmission system 606 coupled to the mesh atomizer device 602 for receiving of the mist of droplets 610 and transmitting the mist of droplets 610 into the passenger compartment 104 of the automobile 102 (shown in FIG. 1). According to an embodiment the transmission system 606 includes a conduit 620 pneumatically and fluidically coupled to the mesh atomizer device 602 for receiving the mist of droplets 610 and a ventilation fan 622 configured in a chamber 624 for blowing the mist of droplets 610 into the passenger compartment 104 via a Heating Ventilation and Air Conditioning (HVAC) ventilation line 626 of the automobile 102. As shown, the conduit 620 is designed to pneumatically and fluidically transport the mist of droplets 610 produced by the mesh atomizer device 602. The conduit 620 is configured to close the mouth of the mesh atomizer device 602 for directing the mist of droplets 610 towards the chamber (624). The conduit 620 may be composed of corrosion-resistant materials. The ventilation fan 622 may be operatively coupled to the electrical power source 604 for obtaining electrical power therefrom. The ventilation fan 622 may be made of a durable material like plastic or metal, and operable to generate airflow for suction of the mist of droplets 610 and to propel the mist of droplets 610 into the HVAC ventilation line 626 of the automobile 102. It will be evident that an HVAC system, governing temperature, and air circulation, ensures the widespread and even distribution of the mist of droplets 610 throughout the passenger compartment 104. According to an embodiment, the transmission system 606 may include only the conduit 620, which may be directly coupled to the ventilation line 626 of the HVAC system.

As shown, the air fragrance diffuser system 600 also includes an electronic control unit 630 operatively coupled with the mesh atomizer device 602. According to an embodiment, the electronic control unit 630 is configured to control the operation of the electrical power source 604. The electronic control unit 630 may be integrated with the mesh atomizer device 602 or may be a separate circuitry operatively coupled with the mesh atomizer device 602. The electronic control unit 630 may be made of electronic components that enable regulating electrical power from the electrical power source 604 to the mesh atomizer device 602. The electronic control unit 630 controls the operation of the electrical power source 604 and thereby controls the volume (or percentage) of the mist of droplets 610 to be ejected by the mesh atomizer device 602. Specifically, the electronic control unit 630 achieves this by modulating the power supplied to the mesh atomizer device 602, influencing the oscillation of a vibratory element and a mesh of the atomizer device, consequently controlling the volume of mist of droplets 610 to be generated. Moreover, the electronic control unit 630 also controls the operation of the transmission system 606. For example, the electronic control unit 630 regulates the speed of the ventilation fan 622 in correlation with the volume of mist of droplets 610 to be generated. The electronic control unit 630 enables in providing a synchronized atomization process, i.e., increasing the speed of the ventilation fan 622 when the volume of generation of the mist of droplets 610 increases, and similarly decreases the speed of the ventilation fan 622 when the volume of generation of the mist of droplets 610 decreases. This enables efficient and regulated deployment (or releases) of the mist of droplets 610 within the passenger compartment 104. Moreover, the electronic control unit 630 may be programmed to adapt and respond to diverse conditions based on a user's need to provide an enhanced and controlled user experience.

Figure 7:
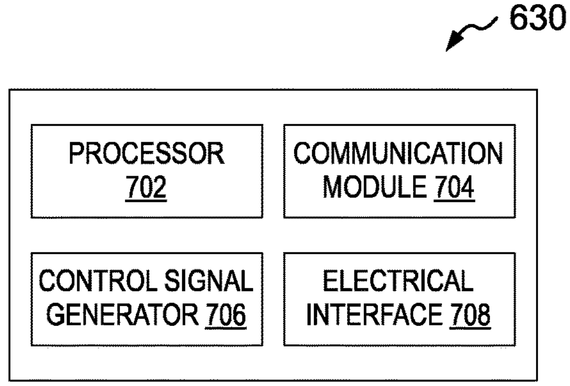
FIG. 7 illustrates a block diagram of the electronic control unit, in accordance with an example embodiment of the present disclosure.

Referring now to FIG. 7, illustrated is a block diagram of the electronic control unit 630, in accordance with an example embodiment of the present disclosure. According to an embodiment, the electronic control unit 630 includes a processor 702, a communication module 704, a control signal generator 706, and an electrical interface 708. The electronic control unit 630 provides different control signals to various components (i.e., the electrical power source 604, the mesh atomizer device 602, and the transmission system 606), which are electrically connected to the electronic control unit 630. In an example, the communication module 704 may be a Bluetooth module. Alternatively, the communication module 704 can be a wireless module such as a GSM module, Infrared, or any near-field communication module. The processor 702 may be a multiprocessor or a microcontroller. The processor 702 is configured to execute program instructions and can read and interpret signals from another electronic device, which will be explained herein later. The processor 702 in response to the interpreted signal, coordinates with the control signal generator 706 to generate various control signals for components (e.g., the electrical power source 604, the mesh atomizer device 602, and the transmission system 606). The electrical interface 708 is configured to provide the control signals to the components by means of wired or any other suitable interface.

Figure 8:
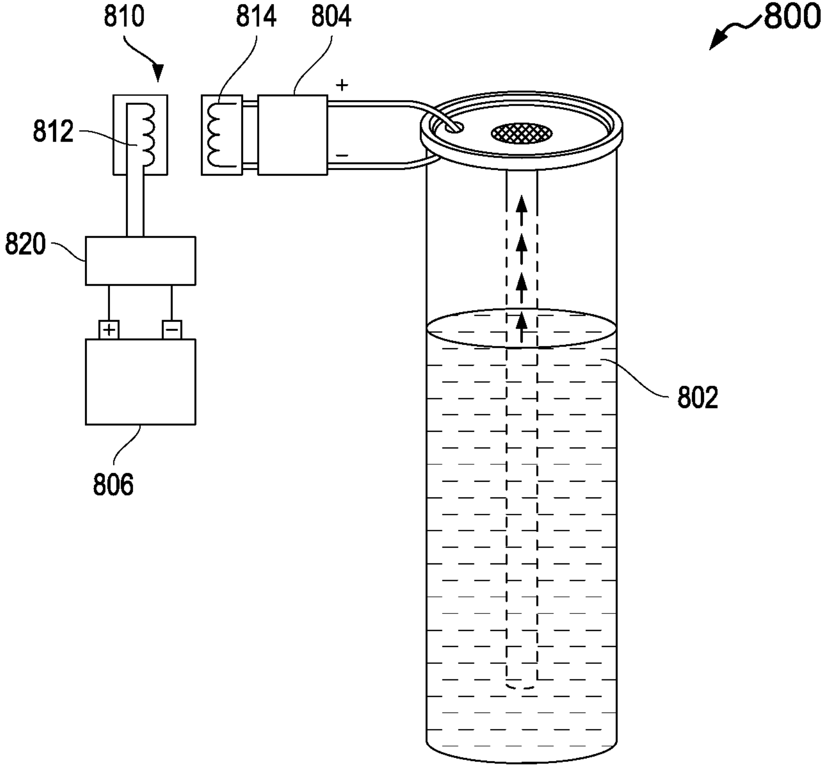
FIG. 8 illustrates a simplified schematic representation of an air fragrance diffuser system having wireless power exchange capability, according to an embodiment of the present disclosure.

Referring now to FIG. 8, illustrated is a simplified schematic representation of an air fragrance diffuser system 800 having wireless power exchange capability, according to an embodiment of the present disclosure. As shown, the air fragrance diffuser system 800 is shown to include a mesh atomizer device 802 (such as the mesh atomizer device 200) operatively coupled to an electronic control unit 804 (such as the electronic control unit 630). The air fragrance diffuser system 800 also includes an electrical power source 806 (such as the electrical power source 112) wirelessly coupled to the mesh atomizer device 802. It will be evident that the air fragrance diffuser system 800 is shown without a transmission system (such as the transmission system 606). According to an embodiment, the air fragrance diffuser system 800 further includes a wireless power transceiver unit 810 operatively coupled to the electronic control unit 804 and the electrical power source 806 for wirelessly exchanging power from the electrical power source 806 to the mesh atomizer device 802. The wireless power transceiver unit 810 includes a transmitter coil 812 operatively associated with the electrical power source 806 and a receiver coil 814 operatively associated with the electronic control unit 804. The electrical power source 806 is located external to the mesh atomizer device 802 and may be selected to be an inductive type of wireless power transfer device. Upon receiving direct current from the electrical power source 806 the transmitter coil 812 may get energized and consequently generate a magnetic field. In an embodiment, suitable electrical components, such as an inverter 820, may be used for converting the direct current of the electrical power source 806 into an alternating current for being provided to the transmitter coil 812. The magnetic field interacts with the receiver coil 814 to induce a voltage in the receiver coil 814, which would be transmitted to the mesh atomizer device 802 via the electronic control unit 804, responsible for regulating the electrical power from the operation of the mesh atomizer device 802. In an embodiment, the number of turns in the transmitter coil 812 and the receiver coil 814 may be selected based on the power transfer requirement. Additionally, suitable electrical components such as but not limited to an oscillator, amplifiers or any other devices may be used to optimum wireless power transmission between the transmitter coil 812 and the receiver coil 814. In another embodiment, the distance between the transmitter coil 812 and the receiver coil 814 may be adjustable for optimum wireless power transmission.

Figure 9:
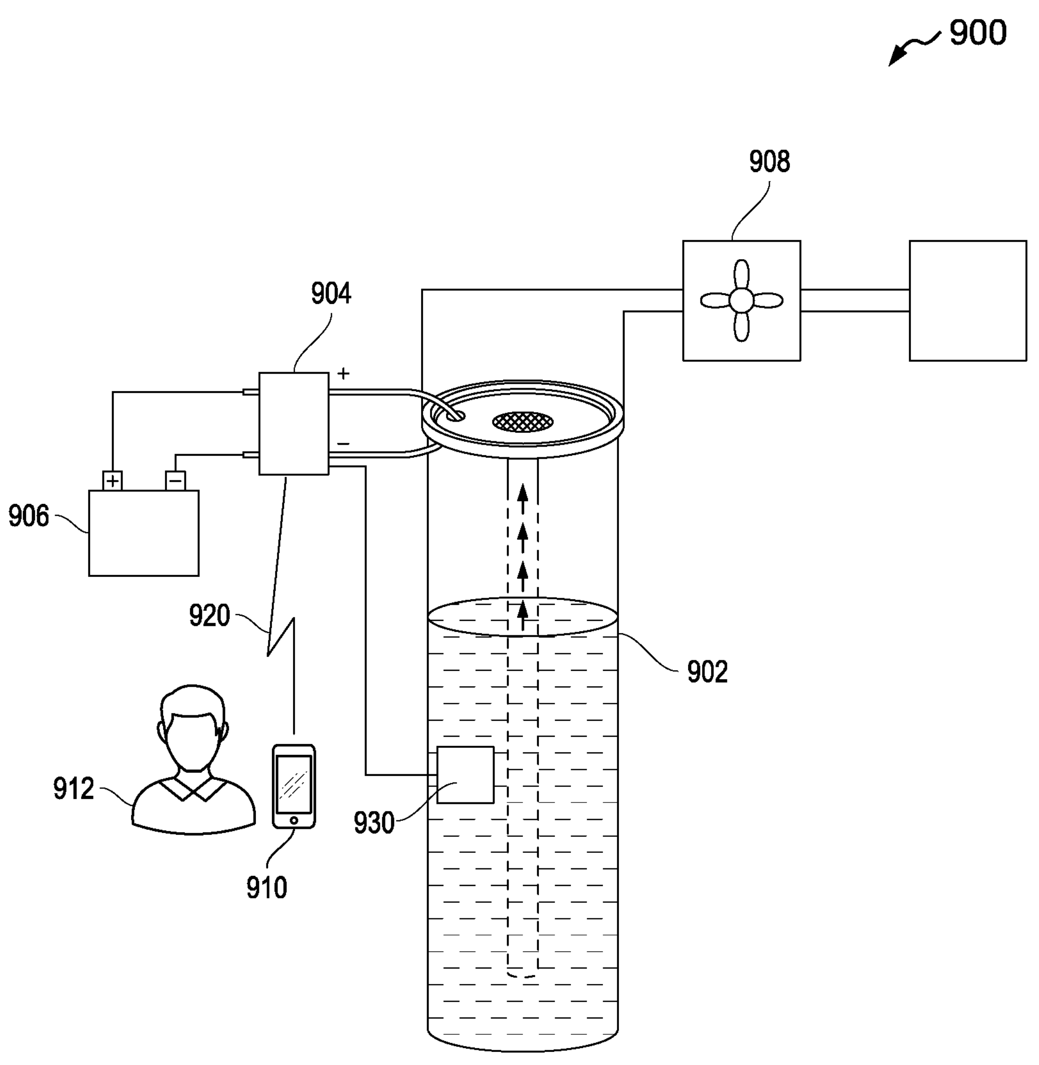
FIG. 9 illustrates a simplified schematic representation of an air fragrance diffuser system having wireless communication capability, according to an embodiment of the present disclosure.

Referring now to FIG. 9, illustrated is a simplified schematic representation of an air fragrance diffuser system 900 having wireless communication capability, according to an embodiment of the present disclosure. As shown, the air fragrance diffuser system 900 is shown to include a mesh atomizer device 902 (such as the mesh atomizer device 200) operatively coupled to an electronic control unit 904 (such as the electronic control unit 630). The air fragrance diffuser system 900 also includes an electrical power source 906 (such as the electrical power source 112) coupled to the mesh atomizer device 902 using wires, and a transmission system 908 (such as the transmission system 606). According to an embodiment, the electronic control unit 904 is communicably coupled to a wireless transceiver 910 associated with a user 912. The variation of the electrical power from the electrical power source 906 can be controlled by the user 912 through the wireless transceiver 910 to increase or decrease the amount of mist of droplets to be generated by the mesh atomizer device 902. The wireless transceiver 910 can be any communication device or may be embodied in a user device including a phone, a computer, a personal digital assistant, a notebook, a laptop, etc., which can send a wireless signal 920. Without loss of generality, the wireless signal 920 can be a Bluetooth signal or radio waves sent from the wireless transceiver 910. A communication module, such as the communication module 704 (shown in FIG. 7) receives the wireless signal 920 sent by the user 912 through the wireless transceiver 910. The communication module works in communication with a processor (such as the processor 702). Further, the electronic control unit 904 sends the alert to the wireless transceiver 910 of the user 912.

According to an embodiment, the electronic control unit 904 is configured to notify the wireless transceiver 910 of a level of the fragrance oil stored in the mesh atomizer device 902. The air fragrance diffuser system 900 further comprises a fluid level sensor 930 communicably coupled to the electronic control unit 904, wherein the electronic control unit 904 upon receipt of a fragrance oil level indicator, transmits a reading of the fragrance oil level indicator to the wireless transceiver 910. In an embodiment, the fluid level sensor 930 intermittently sends an electrical signal to the electronic control unit 904 representing the fragrance oil level in the mesh atomizer device 902. The electrical signal is received by the electronic control unit 904 via an electrical interface. Upon receipt of the electric signals, readings of the fragrance oil level are converted into the wireless signal 920 by the electronic control unit 904. The wireless signal 920 is further sent to the wireless transceiver 910 of the user 912 to inform or notify the user 912 if there is a need to refill the mesh atomizer device 902.

Figure 10:
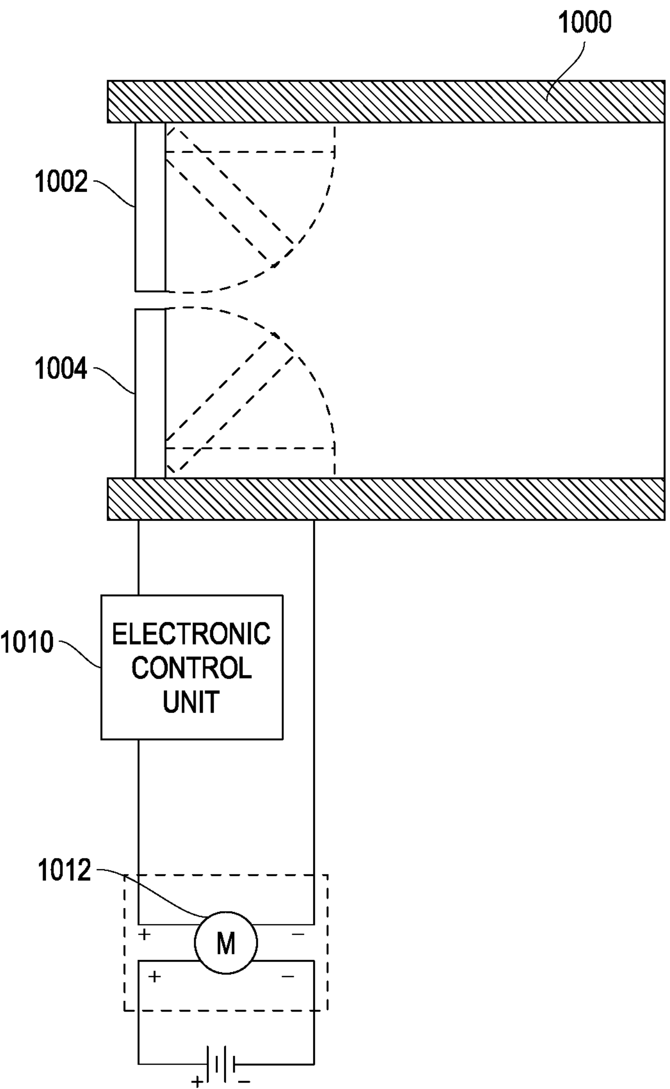
FIG. 10 illustrates a cross-sectional view of a conduit of a transmission system, in accordance with an example embodiment of the present disclosure.

Referring now to FIG. 10, illustrated is a cross-sectional view of a conduit 1000 (such as the conduit 620 of the transmission system 606, shown in FIG. 6), in accordance with an example embodiment of the present disclosure. The conduit 1000 is arranged with one or more baffle disks 1002, 1004. The one or more baffle disks 1002, 1004 are configured to swing between an open position and a closed position in response to a control signal received from the electronic control unit 1010 (such as the electronic control unit 630), wherein the closed position and the open position blocks and allows, respectively, the flow of the mist of droplets into the HVAC ventilation line (such as the ventilation line 626, shown in FIG. 6). In one form, the baffle disks 1002, 1004 is a semi-circular disc disposed in between inner periphery of the conduit 1000 in a co-axial manner, and movement of the baffle disks 1002, 1004 between a horizontal position (i.e. an open position) and a vertical position (i.e. a closed position) is precisely controlled by the electronic control unit 1010 by supplying variable electric current to its step-up motor 1012 which is operatively coupled to the baffle disks 1002, 1004 for providing angular actuation (or movement) thereto. The step-up motor 1012 may include a shaft (not shown) operatively coupled to the baffle disks 1002, 1004 to provide the movement between the horizontal position and the vertical position. In an embodiment, the baffle disks 1002, 1004 are also operatively coupled to the step-up motor (not shown) to provide angular movement for providing variation in the intensity of the mist of droplets of the fragrance oil. In an embodiment, the positions of the baffle disks 1002, 1004 can be controlled by control signals (e.g., the wireless signal 920 received from the user 912 through the wireless transceiver 910. For instance, upon receiving the wireless signal 920, the electronic control unit 1010 supplies an appropriate electrical signal to the step-up motor 1012 associated with the baffle disks 1002, 1004 for controlling the angular movement thereof. Hence, the baffle disks 1002, 1004 may attain a desired position ranging from the open position to the closed position to allow a controlled flow of fragrance mist therefrom. The angular movement from the horizontal position to the vertical position decreases the amount of fragrance mist that can flow into the transmission system and vice-versa. Any intermediate angular position of the baffle disks 1002, 1004 in between the vertical position and the horizontal position depends upon the selection by the user to increase or decrease the intensity of the fragrance mist. For instance, the user may send the wireless signal through the wireless transceiver for a desired intensity of fragrance, which is achieved by letting the baffle disks 1002, 1004 achieve appropriate angular positions.

Figure 11:
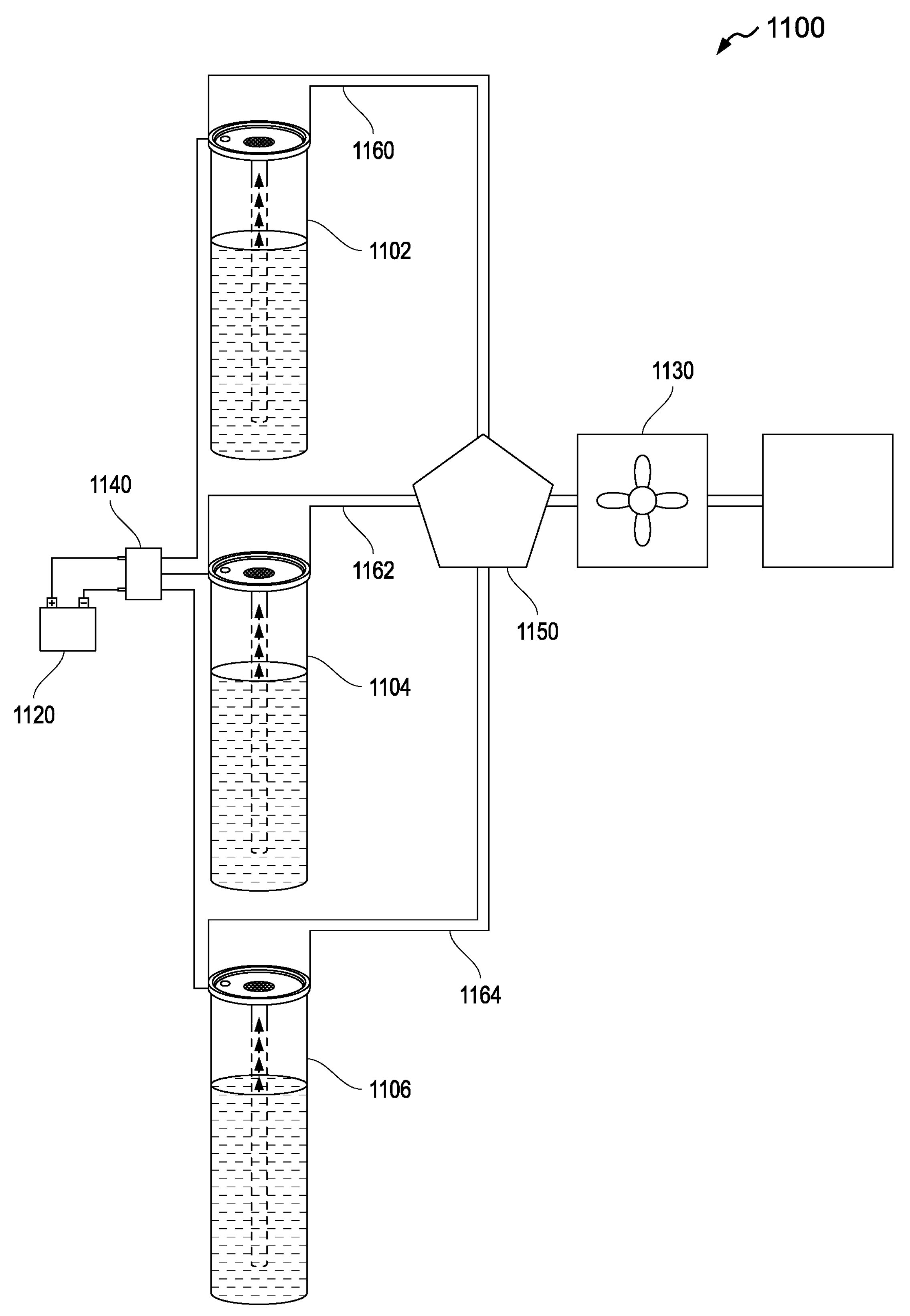
FIG. 11 illustrates a simplified schematic representation of an air fragrance diffuser system having a plurality of mesh atomizer devices, according to an embodiment of the present disclosure.

Referring now to FIG. 11, illustrated is a simplified schematic representation of an air fragrance diffuser system 1100 having a plurality of mesh atomizer devices, according to an embodiment of the present disclosure. As shown, the air fragrance diffuser system 1100 is shown to include the plurality (three) of mesh atomizer devices 1102, 1104, 1106 (such the mesh atomizer devices 200, 400, 500), an electrical power source 1120 (such as the electrical power source 112), a transmission system 1130 (such as the transmission system 606) and an electronic control unit 1140 (such as the electronic control unit 630). According to an embodiment, the air fragrance diffuser system 1100 further includes an electronic valve hub 1150 operatively coupled to the electronic control unit 1140 and arranged between the plurality of mesh atomizer devices 1102, 1104, 1106, and the transmission system 1130. The air fragrance diffuser system 1100 also includes a plurality of conduits 1160, 1162, 1164 pneumatically and fluidically coupling the electronic valve hub 1150 and the plurality of mesh atomizer devices 1102, 1104, 1106, respectively.

According to an embodiment, the electronic valve hub 1150 is a combination of multiple electronic valves operatively coupled with the plurality of conduits 1160, 1162, 1164 for regulating a flow of the mist of droplets from the plurality of mesh atomizer devices 1102, 1104, 1106 towards the transmission system 1130. It will be evident that each of the plurality of conduits 1160, 1162, 1164 is operatively coupled to one of the electronic valves of the electronic valve hub 1150. The electronic valve hub 1150 is electrically connected to the electronic control unit 1140 which provides control signals for changing positions of the multiple electronic valves.

The electronic valve hub 1150 is configured to change the valve position of each of the multiple electronic valves between "open position" to "closed position" and vice-versa, including one or more intermediate positions between the open position and the closed position. In one form, when the automobile is turned ON, each valve of the electronic valve hub 1150 can be set to attain an open position, and these are switched to the closed position only when the air fragrance diffuser system 1100 is disabled by the user. The user, through a wireless transceiver, can control the opening of one or more valves of the electronic valve hub 1150 for discharging varying amounts of the mist of droplets in the passenger compartment of the automobile.

In an application scenario, the user sends a wireless signal through the wireless transceiver. The wireless signal can be received by the electronic control unit 1140 through, for example, a Bluetooth module. The electronic control unit 1140 converts the wireless signal to an electrical control signal and further transmits the electric control signal to the electronic valve hub 1150 for opening and closing of desired valves of the plurality of conduits 1160, 1162, 1164. The user may send the wireless signal representing a preference input for a fragrance from among the fragrance oils associated with the plurality of mesh atomizer devices 1102, 1104, 1106. Also, the preference input may represent a desired intensity of fragrance in the passenger compartment. For instance, if the user selects fragrance option 1 in a user interface (UI) in his user device (i.e., the wireless transceiver), the wireless signal corresponding to the fragrance option 1 is sent to the electronic control unit 1140. It is to be understood that the user device may include a web-based interface or a dedicated mobile application for establishing communication between the user device and the air fragrance diffuser system. The user device accordingly enables the user to adjust settings, monitor the fragrance levels, and potentially access additional features provided by the air fragrance diffuser system. For example, the electronic control unit 1140 interprets the wireless signal and controls the operation of the electronic valve hub 1150 such that fragrance mist generated from the plurality of mesh atomizer devices 1102, 1104, 1106 are selectively allowed to pass through the transmission system 1130 based on a user-defined percentage or amount.

Accordingly, the air fragrance diffuser system, as disclosed above, offers a multifaceted user experience. It is designed to disperse pleasant fragrances from either a single or multiple sealed enclosed chambers, allowing users to choose from a variety of fragrance oils associated with the different mesh atomizer devices. This customization is facilitated through wireless communication, where users can send signals representing their fragrance preferences and desired intensity levels. Moreover, the air fragrance diffuser system goes beyond mere fragrance by incorporating additional benefits. As explained above, the fragrance oils may include anti-bacterial and/or anti-viral properties, providing therapeutic advantages. The user, through a wireless transceiver, can influence the electronic control unit to control the electronic valve hub, regulating the release of fragrance mist from various mesh atomizer devices through conduits. This not only caters to personal fragrance preferences but also addresses health-oriented needs, ensuring a holistic and personalized experience. The user interface, whether web-based or a dedicated mobile application, further enhances user engagement by allowing adjustments to settings, monitoring fragrance levels, and potentially accessing supplementary features, contributing to a sophisticated and user-centric air fragrance diffuser system.

In another embodiment, the air fragrance diffuser system may be integrated with the automobile in a manner such that the user may not require the user device to control the air fragrance diffuser system. For example, the air fragrance diffuser system may be integrated (or communicably coupled) into an infotainment system of the automobile. Accordingly, the air fragrance diffuser system is configured to be a built-in feature of the automobile's infotainment system. This integration enables a more cohesive user experience, allowing passengers to interact with the air fragrance diffuser system through a touch-based display of the infotainment system. The infotainment system can recognize details about the fragrance, such as the type of scent in use, the remaining quantity in the fragrance bottle, and the intensity level at which the air fragrance diffuser system is set. The passengers can conveniently access and control these aspects, directly through the display of the infotainment system. This approach enhances user convenience and accessibility, providing an integrated solution for managing the air fragrance diffuser system without the need for separate external user devices or interfaces.

Various example embodiments of the present disclosure described herein, with reference to various schematic views and block diagrams, are for illustrative purposes and provide numerous advantages and technical effects. For instance, the fragrance diffuser system and its process of converting the fragrance oil into a mist of droplets based on the mesh atomization process. Hence, the process of converting the fragrance oil into the mist of droplets does not affect the chemical properties of fragrance oil. Various embodiments offer users an option of controlling the intensity of fragrance in the passenger compartment with the help of their respective user devices. Also, users can select a particular type of fragrance in the passenger compartment by making an appropriate selection of diffusing processes from among multiple mesh atomizer devices. Moreover, the users can also be notified if the fragrance oil available in the mesh atomizer devices goes below the threshold level. The diffuser systems described herein are configured to disperse fragrance uniformly in the passenger compartment using suitable HVAC vents of the automobile. Also, the present disclosure is modular, scalable, and versatile so that the device may be incorporated in any environment.

Additionally, as compared to the conventional jet nebulization process, the mesh atomization-based fragrance diffuser system of the present disclosure provides various advantages. The advantages of mesh atomization over the jet nebulization process are achieved through differences in their working principles and design. In a jet nebulization process, air pressure is utilized to break liquid medication into aerosolized droplets. This process involves complex mechanical components, such as a jet orifice and siphon tube, leading to a noisier operation. Additionally, the need for compressed air and various mechanical components make the system bulkier and more challenging to maintain. On the other hand, mesh atomization, especially in vibrating mesh nebulizers, operates with a simpler mechanism. The mesh atomizer device comprises a mesh with micro-holes that vibrates using a piezoelectric ring or an ultrasonic horn. This vibration causes the liquid medication to be broken into a mist of droplets. The advantages stem from the reduction in mechanical complexity, the elimination of the need for compressed air, and the absence of noisy components. The mesh atomization system is inherently more compact and quieter, and requires fewer operational components, resulting in decreased maintenance needs and a more controlled and efficient operation. These differences contribute to a more user-friendly experience and potentially reduce the wastage of the medication compared to the traditional jet nebulization process.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, thereby enabling others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims.

What is claimed is:

1. An air fragrance diffuser system for use in an automobile, the air fragrance diffuser system comprising:

a mesh atomizer device for storing a fragrance oil, wherein the mesh atomizer device comprises:

a sealed enclosed chamber for containing the fragrance oil;

a mesh having a plurality of holes, the mesh arranged on the sealed enclosed chamber to be in contact with the fragrance oil; and a vibratory element operatively coupled with the mesh, wherein operation of the vibratory element causes formation of a mist of droplets via the mesh;

an electrical power source for providing electrical power to the mesh atomizer device to convert the fragrance oil into the mist of droplets;

a transmission system coupled to the mesh atomizer device for receiving the mist of droplets and transmitting the mist of droplets into a passenger compartment of the automobile, wherein the transmission system comprises:

a conduit pneumatically and fluidically coupled to the mesh atomizer device for receiving the mist of droplets;

a Heating, Ventilation, and Air Conditioning (HVAC) ventilation line of the automobile;

a chamber fluidically coupled to the HVAC ventilation line; and a ventilation fan configured in the chamber for blowing the mist of droplets received from the conduit through the HVAC ventilation line and into the passenger compartment; and an electronic control unit operatively coupled with the mesh atomizer device, the electronic control unit configured to regulate the electrical power supplied to the vibratory element to control a vibration frequency of the vibratory element and thereby regulate a size of droplets ejected through the mesh, and to regulate a speed of the ventilation fan in correlation with the volume of the mist of droplets.

2. The air fragrance diffuser system as claimed in claim 1, wherein the vibratory element is a piezoelectric ring coupled to the mesh, and the piezoelectric ring causes the mesh to vibrate to form the mist of droplets.

3. The air fragrance diffuser system as claimed in claim 1, wherein the vibratory element is an ultrasonic horn positioned adjacent to the mesh, and the ultrasonic horn conducts vibration to the mesh via a thin layer of the fragrance oil to form the mist of droplets.

4. The air fragrance diffuser system as claimed in claim 1, wherein the mesh is in contact with the fragrance oil via one of: a wick, a capillary tube, a micropump, or gravity.

5. The air fragrance diffuser system as claimed in claim 1, wherein the mesh atomizer device further comprises a microheater for heating the fragrance oil to regulate viscosity of the fragrance oil.

6. The air fragrance diffuser system as claimed in claim 1, wherein the electrical power source is one of: a battery of the automobile or an additional battery integrated with the mesh atomizer device.

7. The air fragrance diffuser system as claimed in claim 1, further comprising a wireless power transceiver unit operatively coupled to the electronic control unit and the electrical power source for wirelessly regulating power from the electrical power source to the mesh atomizer device.

8. The air fragrance diffuser system as claimed in claim 7, wherein regulating the electrical power from the electrical power source to the mesh atomizer device allows controlling a frequency of vibration of the vibratory element thereby regulating size of droplets ejected by the mesh to form the mist of droplets from the fragrance oil.

9. The air fragrance diffuser system as claimed in claim 7, wherein the electronic control unit is communicably coupled to a wireless transceiver associated with a user, the electronic control system configured to notify the wireless transceiver of a level of the fragrance oil stored in the mesh atomizer device.

10. The air fragrance diffuser system as claimed in claim 9, further comprising a fluid level sensor communicably coupled to the electronic control unit, wherein the electronic control unit upon receipt of a fragrance oil level indicator, transmits a reading of the fragrance oil level indicator to the wireless transceiver.

11. The air fragrance diffuser system as claimed in claim 10, wherein the conduit is arranged with one or more baffle disks, wherein the one or more baffle disks are configured to swing between an open position and a closed position in response to a control signal received from the electronic control unit, wherein the closed position and the open position blocks and allows, respectively, a flow of the mist of droplets into the HVAC ventilation line.

12. An air fragrance diffuser system for use in an automobile, the air fragrance diffuser system comprising:

a plurality of mesh atomizer devices for storing a fragrance oil;

wherein each of the mesh atomizer device comprises:

a sealed enclosed chamber for containing the fragrance oil;

a mesh having a plurality of holes, the mesh arranged on the sealed enclosed chamber to be in contact with the fragrance oil; and a vibratory element operatively coupled with the mesh, wherein operation of the vibratory element causes formation of a mist of droplets via the mesh;

an electrical power source for providing electrical power to the mesh atomizer device to convert the fragrance oil into the mist of droplets;

a transmission system coupled to the mesh atomizer device for receiving the mist of droplets and transmitting the mist of droplets into a passenger compartment of the automobile, wherein the transmission system comprises:

a conduit pneumatically and fluidically coupled to the mesh atomizer device for receiving the mist of droplets;

a Heating, Ventilation, and Air Conditioning (HVAC) ventilation line of the automobile;

a chamber fluidically coupled to the HVAC ventilation line; and a ventilation fan configured in the chamber for blowing the mist of droplets received from the conduit through the HVAC ventilation line and into the passenger compartment; and an electronic control unit operatively coupled with the mesh atomizer device, the electronic control unit configured to regulate the electrical power supplied to the vibratory element to control a vibration frequency of the vibratory element and thereby regulate a size of droplets ejected through the mesh, and to regulate a speed of the ventilation fan in correlation with a volume of the mist of droplets.

13. The air fragrance diffuser system as claimed in claim 12, further comprising:

an electronic valve hub operatively coupled to the electronic control unit and arranged between the plurality of mesh atomizer devices and the transmission system; and a plurality of conduits pneumatically and fluidically coupling the electronic valve hub and the plurality of atomizer devices.

14. The air fragrance diffuser system as claimed in claim 12, wherein the vibratory element is a piezoelectric ring coupled to the mesh, the piezoelectric ring causes the mesh to vibrate to form the mist of droplets.

15. The air fragrance diffuser system as claimed in claim 12, wherein the vibratory element is an ultrasonic horn positioned adjacent to the mesh, the ultrasonic horn conducts vibration to the mesh via a thin layer of the fragrance oil to form the mist of droplets.

16. The air fragrance diffuser system as claimed in claim 12, wherein the mesh is allowed to contact the fragrance oil via one of: a wick, a capillary tube, a micropump and gravity.

* * * * *